(12) United States Patent
Kifuji et al.

(10) Patent No.: US 10,122,231 B2
(45) Date of Patent: Nov. 6, 2018

(54) ROTOR AND ROTARY ELECTRIC MACHINE

(71) Applicant: DAIKIN INDUSTRIES, LTD., Osaka-shi, Osaka (JP)

(72) Inventors: Nobuyuki Kifuji, Shiga (JP); Yoshiki Yasuda, Shiga (JP); Yoshinari Asano, Shiga (JP); Yasuhiko Ohsawa, Shiga (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 86 days.

(21) Appl. No.: 14/431,268

(22) PCT Filed: Sep. 30, 2013

(86) PCT No.: PCT/JP2013/005829
§ 371 (c)(1),
(2) Date: Mar. 25, 2015

(87) PCT Pub. No.: WO2014/050154
PCT Pub. Date: Apr. 3, 2014

(65) Prior Publication Data
US 2015/0372547 A1 Dec. 24, 2015

(30) Foreign Application Priority Data

Sep. 28, 2012 (JP) .................. 2012-218294

(51) Int. Cl.
*H02K 21/12* (2006.01)
*H02K 1/27* (2006.01)
(52) U.S. Cl.
CPC ......... *H02K 1/2773* (2013.01); *H02K 1/2766* (2013.01); *H02K 2213/03* (2013.01)

(58) Field of Classification Search
CPC .. H02K 1/2773; H02K 1/276; H02K 2213/03; H02K 1/27; H02K 21/12;
(Continued)

(56) References Cited

U.S. PATENT DOCUMENTS 6,031,311 A 2/2000 Lee
6,225,724 B1 5/2001 Toide et al.
(Continued)

FOREIGN PATENT DOCUMENTS

EP 1 643 618 A2 4/2006
EP 2 306 105 A1 4/2011
(Continued)

OTHER PUBLICATIONS

PCT/ISA/210 International Search Report of PCT/JP2013/005829 dated Dec. 3, 2013.

*Primary Examiner* — Joshua Benitez Rosario
*Assistant Examiner* — Leda Pham
(74) *Attorney, Agent, or Firm* — Birch, Stewart, Kolasch & Birch, LLP (57) ABSTRACT

Each of permanent magnets includes a magnet body formed across the radial direction of a rotor core, and a pair of magnet end parts bending toward the outer peripheral side of the magnet body and extending respectively from both ends of the magnet body in the peripheral direction toward the outer edge of the rotor core. Magnetization directions of the magnet end parts and a magnetic pole center line intersect with each other on the outer peripheral side of the magnet body. The inclination angle of each magnetization direction of the magnet end parts with respect to the magnetic pole center line is greater than the inclination angle of a magnetization direction of the magnet body with respect to the magnetic pole center line.

5 Claims, 9 Drawing Sheets (58) Field of Classification Search
CPC .......... H02K 5/24; H02K 19/02; H02K 16/00; H02K 1/22; H02K 19/10; H02K 16/02
See application file for complete search history.

(56) References Cited

U.S. PATENT DOCUMENTS

| | | | | |
|---|---|---|---|---|
| 7,598,645 | B2* | 10/2009 | Ley | H02K 1/2766 310/156.38 |
| 2002/0041127 | A1 | 4/2002 | Naito et al. | |
| 2003/0011265 | A1* | 1/2003 | Hattori | H02K 1/2766 310/156.38 |
| 2005/0001503 | A1* | 1/2005 | Hans | H02K 1/2766 310/156.53 |
| 2005/0023923 | A1 | 2/2005 | Chu et al. | |
| 2006/0170301 | A1* | 8/2006 | Masuzawa | H02K 1/276 310/156.53 |

FOREIGN PATENT DOCUMENTS

| | | |
|---|---|---|
| ES | 1068612 U | 11/2008 |
| JP | H06-38415 A | 2/1994 |
| JP | 10-304610 A | 11/1998 |
| JP | 2000-197320 A | 7/2000 |
| JP | 2002-44889 A | 2/2002 |
| JP | 2002-78259 A | 3/2002 |
| JP | 2004-346757 A | 12/2004 |
| JP | 2004-357489 A | 12/2004 |
| JP | 2005-020991 A | 1/2005 |
| JP | 2005-51979 A | 2/2005 |
| JP | 3145510 U | 10/2008 |

* cited by examiner

ROTOR AND ROTARY ELECTRIC MACHINE

TECHNICAL FIELD

The present invention relates to a rotor and a rotary electric machine, and particularly relates to a rotor structure.

BACKGROUND ART

Conventionally, rotary electric machines such as electric motors and electric generators have been utilized (see, e.g., Patent Document 1). Moreover, it has been known that, in the rotary electric machine of this type, the surface area of permanent magnets (more specifically, the area of the outer peripheral surfaces of the permanent magnets) embedded in a rotor is increased to increase the magnetic flux of the permanent magnets. Particularly in the case where the permanent magnets are bonded magnets, a residual magnetic flux density is lower in the bonded magnet than in a rare-earth sintered magnet, and therefore, it is effective that the surface area of the permanent magnets is increased to increase the magnetic flux of the permanent magnets.

CITATION LIST

Patent Document

PATENT DOCUMENT 1: Japanese Unexamined Patent Publication No. 2004-346757

SUMMARY OF THE INVENTION

Technical Problem

However, even if the surface area of the permanent magnets is increased to increase the magnetic flux of the permanent magnets, there is a chance that part of the magnetic flux of the permanent magnet does not link with teeth (hereinafter referred to as "counter teeth") facing the permanent magnet, but leaks to other teeth (hereinafter referred to as "adjacent teeth") adjacent to the counter teeth. Particularly in the case where coils are wound around the teeth by concentrated winding, magnetic flux leakage from the permanent magnet to the adjacent teeth tends to occur. When the magnetic flux of the permanent magnet leaks to the adjacent teeth as described above, the amount of flux linkage of the permanent magnet (i.e., the amount of magnetic flux linking with the counter teeth) decreases, and therefore, the efficiency of the operation of the rotary electric machine may be lowered. For example, the copper loss of the rotary electric machine may increase.

For the above-described reasons, the present invention is intended to provide a rotor capable of suppressing a decrease in the amount of flux linkage of a permanent magnet.

Solution to the Problem

A first aspect of the invention is intended for a rotor including a rotor core (110); and a plurality of permanent magnets (100) embedded in the rotor core (110). Each permanent magnet (100) includes a magnet body (101) formed across the radial direction of the rotor core (110), and a pair of magnet end parts (102) bending toward the outer peripheral side of the magnet body (101) and extending respectively from both ends of the magnet body (101) in the peripheral direction toward the outer edge of the rotor core (110), magnetization directions (D2) of the magnet end parts (102) of the permanent magnet (100) and a magnetic pole center line (PC) of the permanent magnet (100) intersect with each other on the outer peripheral side of the magnet body (101) of the permanent magnet (100), and the inclination angle ($\theta 2$) of each magnetization direction (D2) of the magnet end part (102) of the permanent magnet (100) with respect to the magnetic pole center line (PC) of the permanent magnet (100) is greater than the inclination angle ($\theta 1$) of a magnetization direction (D1) of the magnet body (101) of the permanent magnet (100) with respect to the magnetic pole center line (PC) of the permanent magnet (100).

In the first aspect of the invention, the magnetic flux of the magnet end parts (102) of the permanent magnet (100) can easily extend toward the magnetic pole center line (PC) of the permanent magnet (100) on the outer peripheral side of the magnet body (101) of the permanent magnet (100), and therefore, magnetic flux leakage of the permanent magnets (100) (more specifically, magnetic flux leakage from the permanent magnet (100) to adjacent teeth) can be reduced.

A second aspect of the invention is intended for the rotor of the first aspect of the invention, in which the permanent magnets (100) are bonded magnets.

In the second aspect of the invention, the permanent magnets (100) can be formed by injection molding using molten resin containing magnet powder.

A third aspect of the invention is intended for the rotor of the second aspect of the invention, in which the extension width (W) of the magnet end part (102) of the permanent magnet (100) is shorter than the extension length (L) of the magnet end part (102) of the permanent magnet (100).

In the third aspect of the invention, the magnetic resistance in the width direction of the magnet end part (102) can be lower than the magnetic resistance in the length direction of the magnet end part (102). Thus, the magnet end parts (102) can be easily magnetized such that the magnetization directions (D2) of the magnet end parts (102) intersect with the length direction thereof.

A fourth aspect of the invention is intended for the rotor of the second or third aspect of the invention, in which the magnet body (101) of the permanent magnet (100) is formed in a curved shape so as to be raised toward the outer edge of the rotor core (110), and the magnet end parts (102) of the permanent magnet (100) are formed so as to continuously extend respectively from both ends of the magnet body (101) of the permanent magnet (100) in the peripheral direction toward the outer edge of the rotor core (110).

In the fourth aspect of the invention, since the magnet body (101) bends in the shape raised toward the outer edge of the rotor core (110), the distance between the outer peripheral surface of the magnet body (101) and the outer edge of the rotor core (110) can be shortened. Thus, magnetic saturation can be easily caused at the part (i.e., the outer peripheral part of the rotor core (110)) between the outer peripheral surface of the permanent magnet (100) and the outer edge of the rotor core (110), leading to a decrease in the d-axis inductance of the rotor (11).

Moreover, in the fourth aspect of the invention, the magnet body (101) bends in the shape raised toward the outer edge of the rotor core (110), and the magnet end parts (102) bend toward the outer edge of the rotor core (110). Thus, the area of the outer peripheral surface (i.e., the magnetic pole face) of the permanent magnet (100) can be increased as compared to the case where the magnet body (101) is formed straight. This can increase the amount of flux linkage of the permanent magnet (100).

Further, in the fourth aspect of the invention, since the magnet body (101) and the magnet end parts (102) are integrally formed, occurrence of magnetic flux leakage between the magnet body (101) and each magnet end part (102) can be suppressed. Thus, the amount of flux linkage of the permanent magnet (100) can be increased.

As just described, in the fourth aspect of the invention, the d-axis inductance of the rotor (11) can be decreased, and the amount of flux linkage of the permanent magnet (100) can be increased. Thus, the ratio ($\varphi a/Ld$) of the flux linkage amount to the d-axis inductance can be increased.

A fifth aspect of the invention is intended for the rotor of the fourth aspect of the invention, in which the minimum radial distance (L2) from the outer peripheral surface of the magnet body (101) of the permanent magnet (100) to the outer edge of the rotor core (110) is shorter than the radial distance (L1) from the contact point (P) between the magnet body (101) and the magnet end part (102) of the permanent magnet (100) to the outer edge of the rotor core (110).

In the fifth aspect of the invention, the outer peripheral surface of the magnet body (101) can be positioned closer to the outer edge of the rotor core (110). This results in a shorter distance between the outer peripheral surface of the magnet body (101) and the outer edge of the rotor core (110).

A sixth aspect of the invention is intended for the rotor of the fourth or fifth aspect of the invention, in which the radial distance (L3) from a tip end of the magnet end part (102) of the permanent magnet (100) to the outer edge of the rotor core (110) is shorter than the minimum radial distance (L2) from the outer peripheral surface of the magnet body (101) of the permanent magnet (100) to the outer edge of the rotor core (110).

In the sixth aspect of the invention, the tip end of the magnet end part (102) can be positioned closer to the outer edge of the rotor core (110). Thus, occurrence of magnetic flux leakage between adjacent ones of the permanent magnets (100) can be suppressed.

A seventh aspect of the invention is intended for the rotor of any one of the fourth to sixth aspects of the invention, in which the magnet end part (102) of the permanent magnet (100) extends in the radial direction of the rotor core (110).

In the seventh aspect of the invention, the magnetic flux of the magnet end parts (102) can be effectively utilized. That is, the flow of magnetic flux between the magnet end part (102) of the permanent magnet (100) and the counter tooth part (the tooth part (212) facing the permanent magnet (100)) of the stator (12) is facilitated while the flow of magnetic flux between the magnet end part (102) of the permanent magnet (100) and the adjacent tooth part (another tooth part (212) adjacent to the counter tooth part) of the stator (12) can be reduced.

An eighth aspect of the invention is intended for the rotor of any one of the fourth to seventh aspects of the invention, in which the permanent magnet (100) is formed symmetrical with respect to the magnetic pole center line (PC) of the permanent magnet (100).

In the eighth aspect of the invention, the symmetric magnetic flux distribution of the permanent magnet (100) can be ensured.

A ninth aspect of the invention is intended for a rotary electric machine including the rotor (11) of any one of the first to eighth aspects of the invention; and a stator (12) into which the rotor (11) is inserted.

In the ninth aspect of the invention, a decrease in the amount of flux linkage of the permanent magnet (100) in the rotor (11) can be suppressed.

ADVANTAGES OF THE INVENTION

According to the first aspect of the invention, since magnetic flux leakage of the permanent magnet (100) can be reduced, a decrease in the amount of flux linkage of the permanent magnet (100) in the rotor (11) can be suppressed.

According to the second aspect of the invention, the permanent magnets (100) can be formed by injection molding using molten resin containing magnet powder, the permanent magnets (100) can be more easily embedded in the rotor core (110) as compared to the case where the permanent magnets (100) are sintered magnets.

According to the third aspect of the invention, the magnet end parts (102) can be easily magnetized such that the magnetization directions (D2) of the magnet end parts (102) intersect with the length direction thereof. Consequently, the permanent magnets (100) can be easily magnetized such that the magnetization directions (D2) of the magnet end parts (102) and the magnetic pole center line (PC) intersect with each other on the outer peripheral side of the magnet body (101) and that the inclination angle ($\theta 2$) of the magnetization direction (D2) of the magnet end part (102) is greater than the inclination angle ($\theta 1$) of the magnetization direction (D1) of the magnet body (101).

According to the fourth aspect of the invention, the ratio ($\varphi a/Ld$) of the flux linkage amount to the d-axis inductance can be increased. This results in less severe current limitation in rotation control (in particular, flux weakening control).

According to the fifth aspect of the invention, the distance between the outer peripheral surface of the magnet body (101) and the outer edge of the rotor core (110) can be shortened. Thus, the d-axis inductance of the rotor core (110) can be further decreased.

According to the sixth aspect of the invention, occurrence of magnetic flux leakage between adjacent ones of the permanent magnets (100) can be suppressed, leading to a further increase in the amount of flux linkage of the permanent magnet (100).

According to the seventh aspect of the invention, since the magnetic flux of the magnet end parts (102) can be effectively utilized, the amount of flux linkage of the permanent magnet (100) can be further increased.

According to the eighth aspect of the invention, since the symmetric magnetic flux distribution of the permanent magnet (100) can be ensured, torque ripple occurring in rotary driving of the rotor (11) can be reduced.

According to the ninth aspect of the invention, since a decrease in the amount of flux linkage of the permanent magnet (100) in the rotor (11) can be suppressed, lowering of the efficiency of the operation of the rotary electric machine (10) can be suppressed.

DESCRIPTION OF EMBODIMENTS

Embodiments will be described below in detail with reference to drawings. Note that the same reference numerals are used to represent the same or equivalent elements in the drawings, and the description thereof will not be repeated.

[Rotary Electric Machine]

Figure 1:
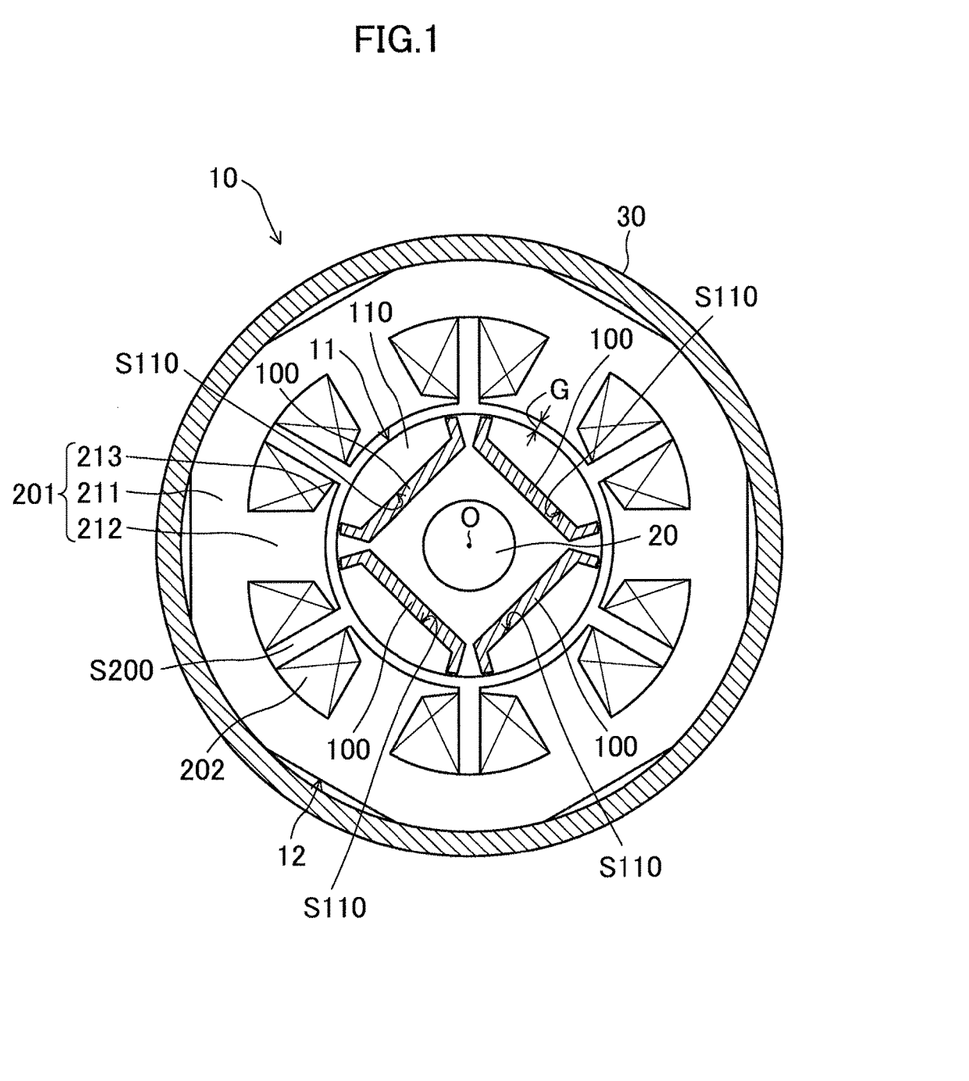
FIG. 1 is a cross-sectional view illustrating an example configuration of a rotary electric machine.
Figure 2:
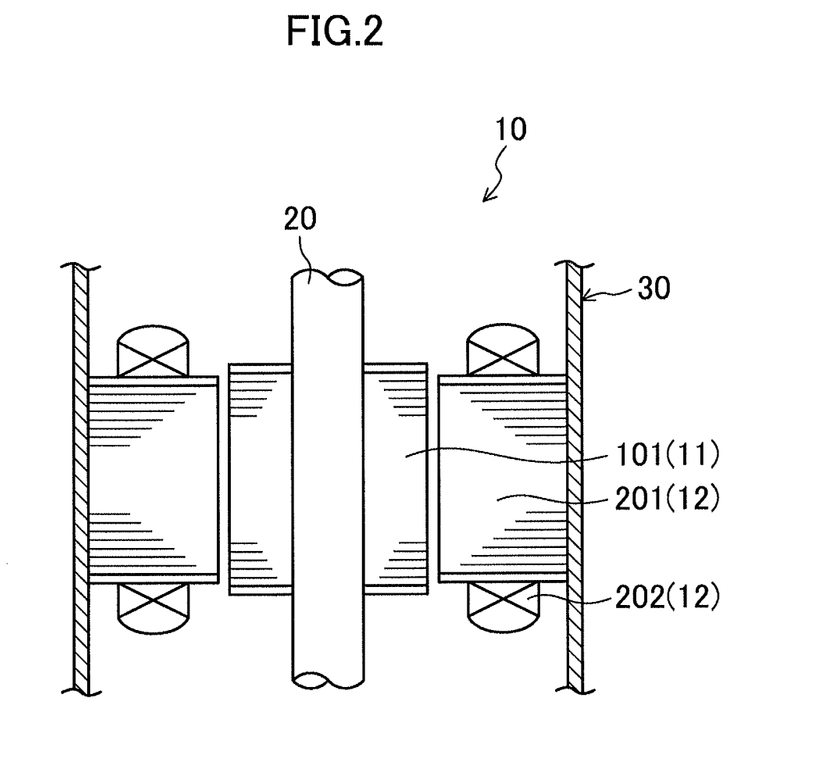
FIG. 2 is a longitudinal sectional view illustrating the example configuration of the rotary electric machine.

FIGS. 1 and 2 are a cross-sectional view and a longitudinal sectional view of a rotary electric machine (10) of the present embodiment, respectively. For example, the rotary electric machine (10) is used as an electric motor for driving a compressor of an air conditioner (not shown). In this example, the rotary electric machine (10) forms an embedded-magnet motor (an IPM motor). The rotary electric machine (10) includes a rotor (11) and a stator (12), and is housed in a casing (30) (e.g., a casing of the compressor). The rotor (11) is fixed to a drive shaft (20).

In the description made below, an "axial direction" indicates the direction along the center of the drive shaft (20) (i.e., the center (O) of rotation of the rotor (11)), a "radial direction" indicates the direction perpendicular to the axial direction of the drive shaft (20), and a "peripheral direction" indicates the direction about the center of the drive shaft (20). Moreover, an "outer peripheral side" indicates the side farther from the center of the drive shaft (20), and an "inner peripheral side" indicates the side closer to the center of the drive shaft (20). Note that a "longitudinal section" indicates a section taken along the axial direction, and a "cross section" indicates a section perpendicular to the axial direction.

<Stator>

The rotor (11) is rotatably inserted into the stator (12). In this example, the rotor (11) is formed in a circular columnar shape, and the stator (12) is formed in a circular cylindrical shape. Specifically, the stator (12) includes a stator core (201) and coils (202). Note that in FIG. 1, the stator core (201) is not hatched.

<<Stator Core>>

The stator core (201) is formed in a circular cylindrical shape. Specifically, the stator core (201) includes a back yoke part (211), a plurality of tooth parts (212) (in this example, six tooth parts (212)), and a plurality of brim parts (213) (in this example, six brim parts (213)). For example, the stator core (201) may be formed in such a manner that magnetic steel plates are, by pressing, punched out to form a plurality of plates (annular flat plates) for stacking and the plates for stacking are stacked on each other in the axial direction.

The back yoke part (211) forms the outer peripheral part of the stator core (201), and is formed in a circular cylindrical shape. The back yoke part (211) is, at the outer circumference thereof, fixed to an inner surface of the casing (30).

Each tooth part (212) is formed in a rectangular parallelepiped shape extending from an inner peripheral surface of the back yoke part (211) in the radial direction. The tooth parts (212) are arranged at predetermined intervals in the peripheral direction, and a coil slot (S200) in which the coil (202) is housed is formed between adjacent ones of the tooth parts (212).

The brim parts (213) are continuously formed on the inner peripheral side of the tooth parts (212). Moreover, the brim part (213) is formed such that the width thereof (the length in the peripheral direction) is longer than the width of the tooth part (212), and inner peripheral surfaces of the brim parts (213) form a circular cylindrical shape. The inner peripheral surfaces (the circular cylindrical surface) of the brim parts (213) faces an outer peripheral surface (a circular cylindrical surface) of the rotor (11) with a predetermined distance (an air gap (G)).

<<Coil>>

The coils (202) are wound respectively around the tooth parts (212) by concentrated winding. That is, each coil (202) is wound around a corresponding one of the tooth parts (212), and the wound coil (202) is housed in the coil slot (S200). Thus, an electromagnet is formed at each tooth part (212).

<Rotor>

Figure 3:
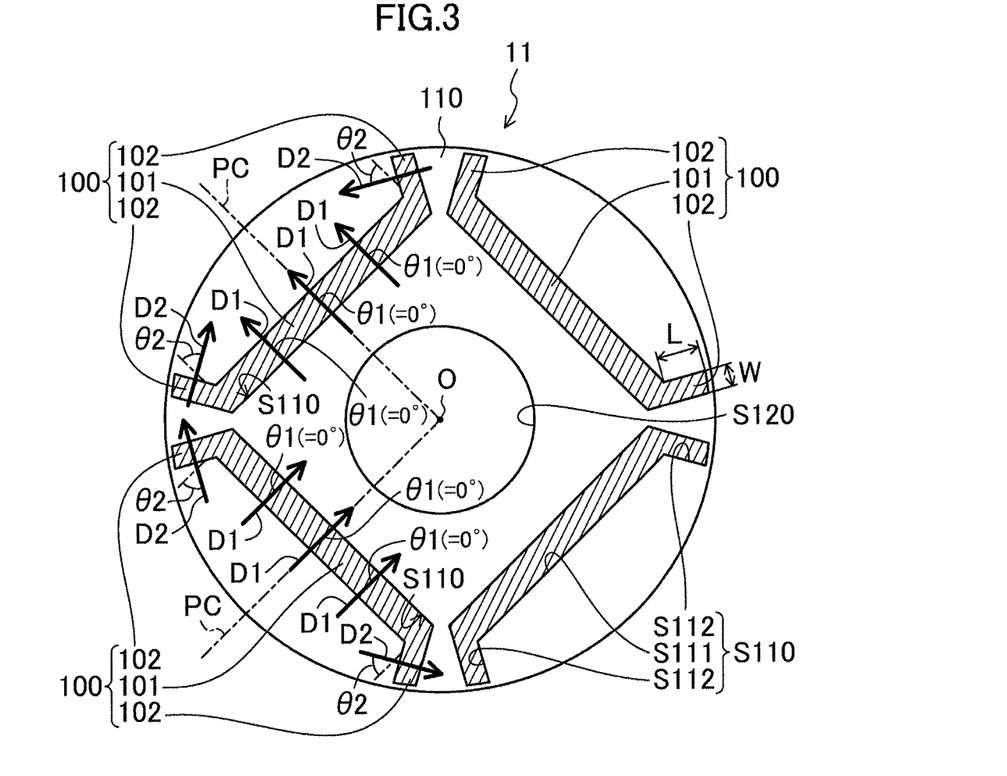
FIG. 3 is a cross-sectional view illustrating an example configuration of a rotor.

Next, the rotor (11) will be described with reference to FIGS. 1 to 3. The rotor (11) includes a rotor core (110) and a plurality of permanent magnets (100) (in this example, four permanent magnets (100)). Note that FIGS. 1 and 3, the rotor core (110) is not hatched.

<<Rotor Core>>

The rotor core (110) is formed in a circular cylindrical shape. For example, the rotor core (110) may be formed in such a manner that magnetic steel plates are, by pressing, punched out to form a plurality of plates (circular flat plates) for stacking and the plates for stacking are stacked on each other in the axial direction. Moreover, a shaft hole (S120) is formed at the center of the rotor core (110). The drive shaft (20) is fixed to the shaft hole (S120) by, e.g., press-fitting.

Magnet Slot

At the rotor core (110), a plurality of magnet slots (S110) (in this example, four magnet slots (S110)) for respectively housing the permanent magnets (100) are formed. The magnet slots (S110) are arranged at predetermined pitches (in this example, a pitch of 90 degrees) in the peripheral direction of the rotor core (110) (i.e., about the center (O) of rotation of the rotor (11)). Moreover, the magnet slots (S110) penetrate the rotor core (110) in the axial direction. Further, each magnet slot (S110) includes a slot body (S111) and a pair of slot end parts (S112).

The slot body (S111) is formed so as to cross the radial direction of the rotor core (110). In this example, the slot body (S111) is formed symmetrical with respect to a magnetic pole center line (PC) of the permanent magnet (100) housed in the magnet slot (S110). That is, the slot body (S111) extends so as to be symmetrical about the magnetic pole center line (PC) of the permanent magnet (100) housed in the magnet slot (S110). Specifically, the slot body (S111) is linearly formed perpendicular to the magnetic pole center line (PC).

The slot end parts (S112) bend toward the outer peripheral surface (an outer-peripheral-side wall surface) of the slot body (S111), and extend respectively from both ends of the slot body (S111) in the peripheral direction toward the outer edge of the rotor core (110). That is, each slot end part (S112) extends so as to incline toward the magnetic pole center line (PC) of the permanent magnet (100) housed in the magnet slot (S110) with respect to the line extending from a corresponding one of both ends of the slot body (S111) in the peripheral direction while extending from the corresponding one of both ends of the slot body (S111) in the peripheral direction toward the outer edge of the rotor core (110). In this example, the slot end part (S112) linearly extends from the end part of the slot body (S111) toward the outer edge of the rotor core (110). Moreover, in this example, each slot end part (S112) continuously extends from a corresponding one of both ends of the slot body (S111) in the peripheral direction. That is, the slot end parts (S112) are integrally formed with the slot body (S111).

<<Permanent Magnet>>

Each permanent magnet (100) is housed in a corresponding one of the magnet slots (S110) of the rotor core (110). That is, in the rotor core (110), the permanent magnets (100) are arranged and embedded at predetermined pitches (in this example, a pitch of 90 degrees) in the peripheral direction of the rotor core (110) (i.e., about the center (O) of rotation of the rotor (11)). The permanent magnet (100) is configured such that an outer peripheral surface (a surface facing the outer peripheral side of the rotor (11)) and an inner peripheral surface (a surface facing the center (O) of rotation) thereof form magnetic pole faces. That is, one of the outer and inner peripheral surfaces of the permanent magnet (100) serves as the south pole, and the other one of the outer and inner peripheral surfaces of the permanent magnet (100) serves as the north pole. The permanent magnets (100) are arranged such that the magnetic pole face of the south pole and the magnetic pole face of the north pole are alternately positioned in the peripheral direction of the rotor (11).

In this example, each permanent magnet (100) is formed and embedded in a corresponding one of the magnet slots (S110) of the rotor core (110) in such a manner that molten resin containing magnet powder (e.g., the powder of a neodymium iron boron-based magnet or the powder of a ferrite magnet) is injected into the magnet slots (S110) and is solidified. That is, the permanent magnets (100) are bonded magnets. In order to obtain desired magnetization directions of the permanent magnets (100), the bonded magnets (the permanent magnets (100)) in the magnet slots (S110) are polarized while the molten resin is being injected into the magnet slots (S110) (or after the molten resin has been injected into the magnet slots (S110)). Note that the magnetization directions of the permanent magnets (100) will be described in detail later.

Shape of Permanent Magnet

The permanent magnets (100) are in the shape corresponding to the opening shape of the magnet slot (S110). That is, each permanent magnet (100) includes a magnet body (101) and a pair of magnet end parts (102).

The magnet body (101) is formed so as to cross the radial direction of the rotor core (110). In this example, the magnet body (101) is formed symmetrical with respect to the magnetic pole center line (PC) of the permanent magnet (100). That is, the magnet body (101) extends so as to be symmetrical about the magnetic pole center line (PC). Specifically, the magnet body (101) is linearly formed perpendicular to the magnetic pole center line (PC).

The magnet end parts (102) bend toward the outer peripheral side of the magnet body (101), and extend respectively from both ends of the magnet body (101) in the peripheral direction toward the outer edge of the rotor core (110). That is, each magnet end part (102) extends so as to incline toward the magnetic pole center line (PC) of the permanent magnet (100) with respect to the line extending from a corresponding one of both ends of the rotor core (110) in the peripheral direction while extending from the corresponding one of both ends of the magnet body (101) in the peripheral direction toward the outer edge of the rotor core (110). In this example, the magnet end part (102) linearly extends from the end part of the magnet body (101) toward the outer edge of the rotor core (110). Moreover, in this example, each magnet end part (102) continuously extends from a corresponding one of both ends of the magnet body (101) in the peripheral direction. That is, the magnet end parts (102) are integrally formed with the magnet body (101).

Magnetization Directions of Permanent Magnet

The magnetization directions (D2) of the magnet end parts (102) of the permanent magnet (100) intersect with the magnetic pole center line (PC) of the permanent magnet (100) on the outer peripheral side of the magnet body (101) of the permanent magnet (100). The inclination angle (θ2) of the magnetization direction (D2) of the magnet end part (102) of the permanent magnet (100) with respect to the magnetic pole center line (PC) of the permanent magnet (100) is greater than the inclination angle (θ1) of the magnetization direction (D1) of the magnet body (101) of the permanent magnet (100) with respect to the magnetic pole center line (PC) of the permanent magnet (100). That is, in this example, the permanent magnets (100) are magnetized (polarized) such that the magnetization directions (D2) of the magnet end parts (102) and the magnetic pole center line (PC) intersect with each other on the outer peripheral side of the magnet body (101) and that the inclination angle (θ2) of the magnetization direction (D2) of the magnet end part (102) with respect to the magnetic pole center line (PC) is greater than the inclination angle (θ1) of the magnetization direction (D1) of the magnet body (101) with respect to the magnetic pole center line (PC). Note that in this example, the inclination angle (θ1) of the magnetization direction (D1) is zero. That is, the magnetization direction (D1) is parallel to the magnetic pole center line (PC).

<Magnetic Flux Leakage between Permanent Magnets>

Figure 4:
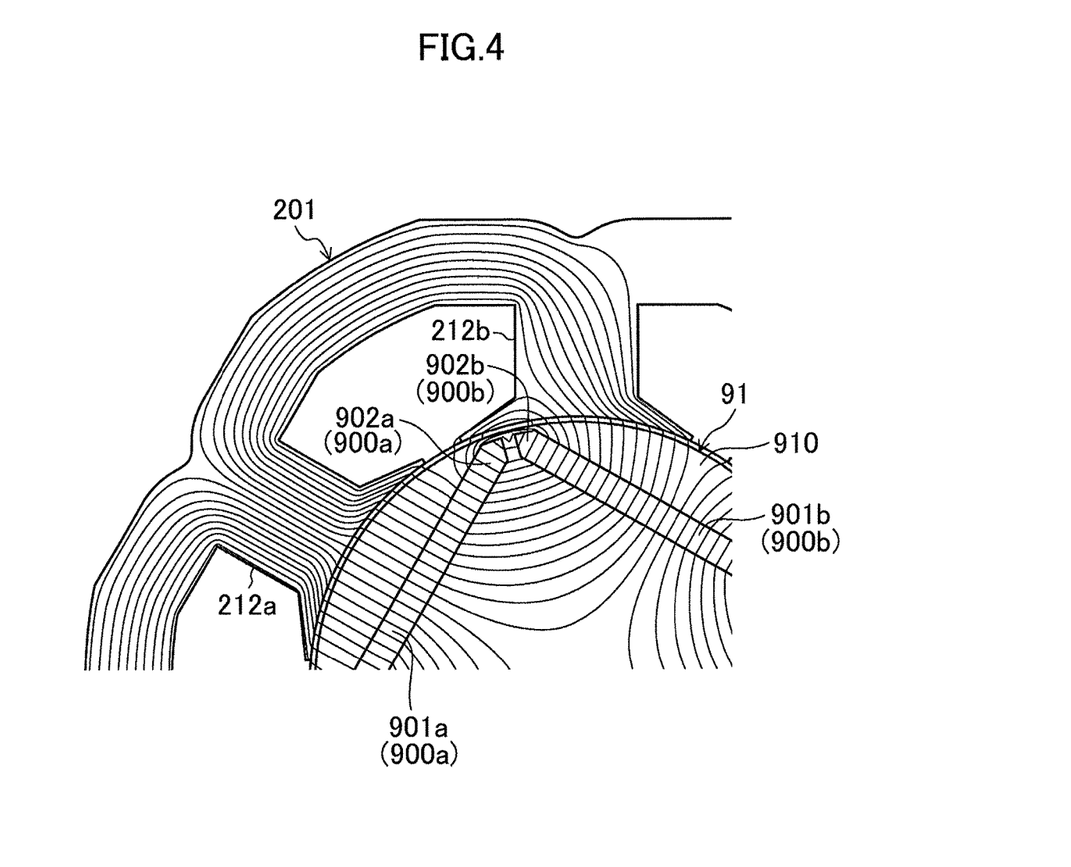
FIG. 4 is a magnetic flux line diagram illustrating the lines of the magnetic flux of a rotary electric machine (of a comparative example).
Figure 5:
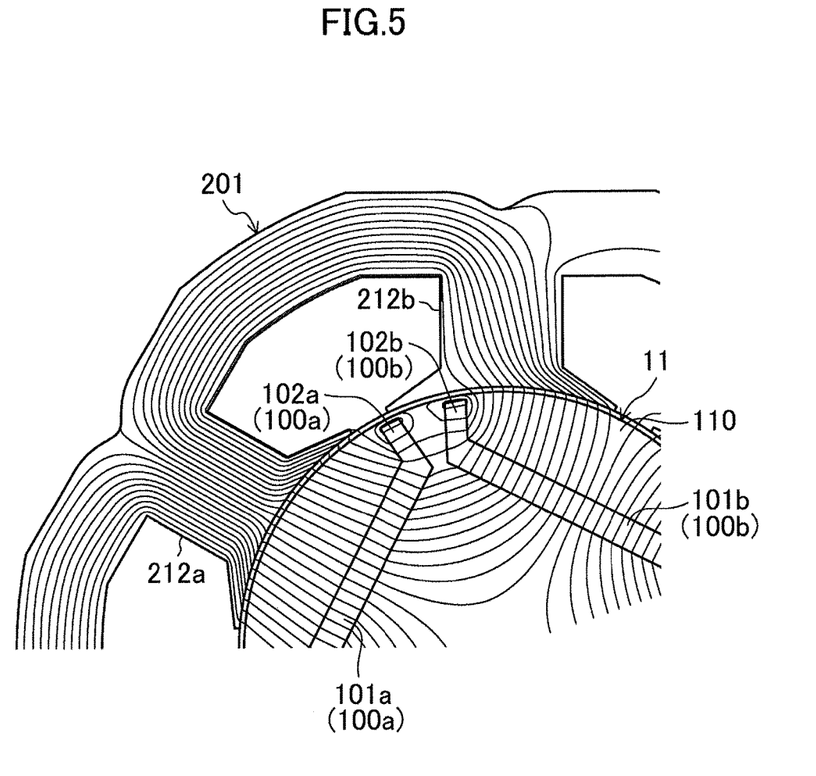
FIG. 5 is a magnetic flux line diagram illustrating the lines of the magnetic flux of a rotary electric machine (of an embodiment).

Next, magnetic flux leakage between adjacent ones of the permanent magnets (100) will be described with reference to FIGS. 4 and 5. FIG. 4 corresponds to a partially-enlarged cross-sectional view of a rotor (11) of a comparative example (hereinafter referred to as a "rotor (91)"), and is a diagram illustrating the lines of magnetic flux. FIG. 5 corresponds to a partially-enlarged cross-sectional view of the rotor (11) of the present embodiment, and is a diagram illustrating the lines of magnetic flux. Note that the lines of magnetic flux are indicated by thin lines in FIGS. 4 and 5. For the sake of simplicity of description, the coils (202) and the shaft hole (S120) are not shown in FIGS. 4 and 5, and a reference character "a" or "b" is assigned to the end of each reference numeral of the permanent magnet and the tooth part.

<<Comparative Example>>

As illustrated in FIG. 4, in the rotor (91), a plurality of permanent magnets (900) (in this example, four permanent magnets (900)) are embedded in a rotor core (910). In each permanent magnet (900), a pair of magnet end parts (902) extend, without bending toward the outer peripheral side of a magnet body (901), toward the outer edge of the rotor core (910) along the lines extending from both ends of the magnet body (901) in the peripheral direction. Moreover, in each permanent magnet (900), the magnetization directions of the magnet end parts (902) are parallel to that of the magnet body (901).

In the rotor (91) illustrated in FIG. 4, the magnetic flux extending from the outer peripheral surface of a magnet body (901a) of a permanent magnet (900a) links with a tooth part (212a) (hereinafter referred to as a "counter tooth part (212a)") facing the permanent magnet (900a), and then, reaches the outer peripheral surface of a magnet body (901b) of a permanent magnet (900b) adjacent to the permanent magnet (900a) by way of a tooth part (212b) (hereinafter referred to as an "adjacent tooth part (212b)") adjacent to the counter tooth part (212a). However, the magnetic flux extending from the outer peripheral surface of a magnet end part (902a) of the permanent magnet (900a) does not link with the counter tooth part (212a), but links with the adjacent tooth part (212b) (more specifically, a brim part (213) continuously formed on the inner peripheral side of the adjacent tooth part (212b)). Then, such magnetic flux reaches the outer peripheral surface of a magnet end part (902b) of the permanent magnet (900b).

As just described, in the rotor (91) illustrated in FIG. 4, the magnetic flux of the magnet end part (902a) of the permanent magnet (900a) leaks to the adjacent tooth part (212b), and therefore, the amount of flux linkage of the permanent magnet (900a) (the amount of magnetic flux linking with the counter tooth part (212a)) decreases by such leakage. Note that as the entire length of the permanent magnet (900) (the length crossing the radial direction of the rotor core (910)) increases in order to expand the surface area of the permanent magnet (900) (specifically, the area of the outer peripheral surface of the permanent magnet (900)), the magnet end parts (902) of the permanent magnet (900) become closer to the air gap (G). Thus, magnetic flux leakage from the permanent magnet (900) to the tooth part (212) tends to increase.

<<Present Embodiment>>

On the other hand, in the rotor (11) of the present embodiment, in each permanent magnet (100), the magnet end parts (102) extend respectively from both ends of the magnet body (101) in the peripheral direction toward the outer edge of the rotor core (110) so as to bend toward the outer peripheral side of the magnet body (101). Moreover, in each permanent magnet (100), the magnetization directions (D2) of the magnet end parts (102) and the magnetic pole center line (PC) intersect with each other on the outer peripheral side of the magnet body (101), and the inclination angle (θ2) of the magnetization direction (D2) of the magnet end part (102) with respect to the magnetic pole center line (PC) is greater than the inclination angle (θ1) of the magnetization direction (D1) of the magnet body (101) with respect to the magnetic pole center line (PC). Thus, the magnetic flux of the magnet end part (102) of the permanent magnet (100) tends to extend toward the magnetic pole center line (PC) of the permanent magnet (100) on the outer peripheral side of the magnet body (101) of the permanent magnet (100). Consequently, as illustrated in FIG. 5, the magnetic flux extending from the inner surface of a magnetic end part (102a) of a permanent magnet (100a) (the surface closer to the magnetic pole center line (PC)) more tends to link with a counter tooth part (212a) facing the permanent magnet (100a), and less tends to link with an adjacent tooth part (212b). For example, the magnetic flux extending from the inner surface of the magnetic end part (102a) of the permanent magnet (100a) does not link with the adjacent tooth part (212b), but links with the counter tooth part (212a). Then, such magnetic flux reaches the inner surface of a magnet end part (102b) of a permanent magnet (100b) adjacent to the permanent magnet (100a) by way of the adjacent tooth part (212b). As just described, the magnetic flux (i.e., magnetic flux leakage) can be reduced, which extends from the magnetic end part (102a) of the permanent magnet (100a) to the permanent magnet (100b) adjacent to the permanent magnet (100a) not by way of the counter tooth part (212a) but by way of the adjacent tooth part (212b). Thus, the amount of flux linkage of the permanent magnet (100a) illustrated in FIG. 5 is greater than the amount of flux linkage of the permanent magnet (900a) illustrated in FIG. 4.

<Advantages of the Embodiment>

As described above, in the rotor (11) of the present embodiment, the magnetic flux of the magnet end parts (102) of the permanent magnet (100) can easily extend toward the magnetic pole center line (PC) of the permanent magnet (100) on the outer peripheral side of the magnet body (101) of the permanent magnet (100), and therefore, magnetic flux leakage of the permanent magnets (100) can be reduced. Thus, since a decrease in the amount of flux linkage of the permanent magnet (100) can be suppressed, lowering of the efficiency of the operation of the rotary electric machine (10) (e.g., an increase in the copper loss of the rotary electric machine (10)) can be suppressed.

Since the permanent magnets (100) are the bonded magnets (i.e., the permanent magnets (100) can be formed by injection molding using molten resin containing magnet powder), the permanent magnets (100) can be more easily embedded in the rotor core (110) as compared to the case where the permanent magnets (100) are sintered magnets. Moreover, the number of components can be reduced.

Since the magnet body (101) and the magnet end parts (102) are integrally formed in each permanent magnet (100), occurrence of magnetic flux leakage between the magnet body (101) and each magnet end part (102) can be suppressed. Thus, the amount of flux linkage of the permanent magnet (100) can be increased.

<Shape of Magnet End Part>

Note that the extension width of the slot end part (S112) is preferably shorter than the extension length of the slot end part (S112). That is, the extension width (W) of the magnet end part (102) is preferably shorter than the extension length (L) of the magnet end part (102). The extension length of the magnet end part (102) is the length of the magnet end part (102) in the extension direction thereof, and the extension width of the magnet end part (102) is the length of the magnet end part (102) in the width direction perpendicular to the extension direction of the magnet end part (102). Note that in FIG. 3, the extension width (W) of the magnet end part (102) is constant from a base end part to a tip end part of the magnet end part (102).

According to the above-described configuration, the magnetic resistance in the width direction (the direction perpendicular to the length direction) of the magnet end part (102) can be lower than the magnetic resistance in the length direction (the extension direction) of the magnet end part (102). Thus, the magnet end parts (102) can be easily magnetized (polarized) such that the magnetization directions (D2) of the magnet end parts (102) intersect with the length direction thereof. Consequently, the permanent magnets (100) can be easily magnetized (polarized) such that the magnetization directions (D2) of the magnet end parts (102) and the magnetic pole center line (PC) intersect with each other on the outer peripheral side of the magnet body (101) and that the inclination angle (θ2) of the magnetization direction (D2) of the magnet end part (102) is greater than the inclination angle (θ1) of the magnetization direction (D1) of the magnet body (101).

<Bonded Magnets>

In the case where the permanent magnets (100) are the bonded magnets, a residual magnetic flux density is lower in the bonded magnet than in a sintered magnet (in particular, a rare-earth sintered magnet). Thus, it is often the case that in order to increase the magnetic flux of the permanent magnet (100), the entire length (the length extending across the radial direction of the rotor core (110)) of the permanent magnet (100) is increased to expand the surface area of the permanent magnet (100) (more specifically, the area of the outer peripheral surface of the permanent magnet (100)). That is, in the case where the permanent magnets (100) are the bonded magnets, the permanent magnets (100) are in such a shape that magnetic flux leakage of the permanent magnets (100) more tends to increase as compared to the case where the permanent magnets (100) are the sintered magnets. Thus, if the permanent magnets (100) are the bonded magnets, it is particularly effective to form the permanent magnets (100) as illustrated in FIG. 3. That is, each permanent magnet (100) is formed such that the magnet end parts (102) bend toward the outer peripheral side of the magnet body (101) so as to extend respectively from both ends of the magnet body (101) in the peripheral direction toward the outer edge of the rotor core (110). Moreover, the permanent magnets (100) are magnetized (polarized) such that the magnetization directions (D2) of the magnet end parts (102) and the magnetic pole center line (PC) intersect with each other on the outer peripheral side of the magnet body (101) and that the inclination angle (θ2) of the magnetization direction (D2) of the magnet end part (102) with respect to the magnetic pole center line (PC) is greater than the inclination angle (θ1) of the magnetization direction (D1) of the magnet body (101) with respect to the magnetic pole center line (PC). This can effectively reduce magnetic flux leakage of the bonded magnets (i.e., the permanent magnets (100)).

<Concentrated Winding>

Magnetic flux leakage of the permanent magnet (900) tends to increase as the area of the inner peripheral surface (more specifically, the inner peripheral surface of the brim part (213)) of the tooth part (212) increases. The area of the inner peripheral surface of the tooth part (212) tends to be larger in the stator (12) (hereinafter referred to as a "concentrated winding-type stator (12)") in which each coil (202) is wound around the tooth part (212) by concentrated winding than in the stator (12) (hereinafter referred to as a "distributed winding-type stator (12)") in which each coil (202) is wound around the tooth parts (212) by distributed winding. That is, more magnetic flux leakage of the permanent magnets (100) tends to occur in the concentrated winding-type stator (12) than in the distributed winding-type stator (12). Thus, in the case where each coil (202) is wound around the tooth part (212) by concentrated winding, it is particularly effective to form the permanent magnets (100) as illustrated in FIG. 3.

[First Variation of Rotor]

Figure 6:
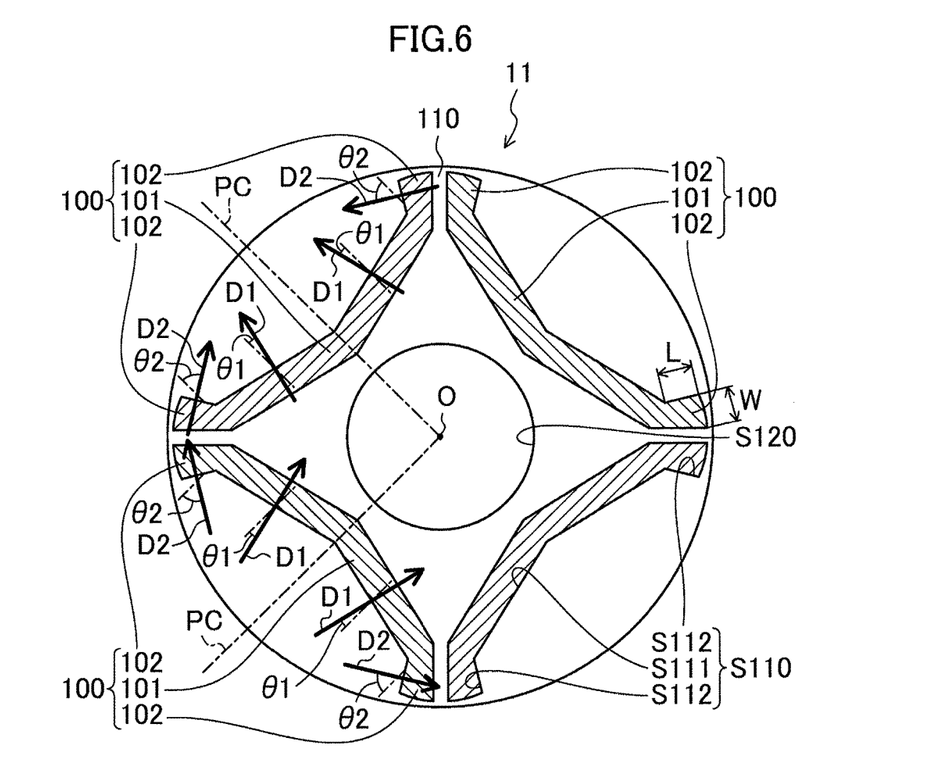
FIG. 6 is a cross-sectional view illustrating a first variation of the rotor.

As illustrated in FIG. 6, the magnet body (101) of the permanent magnet (100) may be formed in a curved shape so as to be raised toward the center (O) of rotation of the rotor core (110). In this example, the magnet body (101) of the permanent magnet (100) is formed in a V-shape so as to be raised toward the center (O) of rotation of the rotor core (110). Moreover, the magnet body (101) of the permanent magnet (100) is formed symmetrical with respect to the magnetic pole center line (PC) of the permanent magnet (100). That is, in this example, the magnet body (101) is formed in a V-shape (a V-shape raised toward the inner peripheral side) so as to be symmetrical about the magnetic pole center line (PC). Note that in this example, the magnet end parts (102) of the permanent magnet (100) also bend toward the outer peripheral side of the magnet body (101) so as to continuously extend respectively from both ends of the magnet body (101) in the peripheral direction toward the outer edge of the rotor core (110).

Moreover, in this example, the magnet end parts (102) of the permanent magnet (100) are formed such that the extension width (W) of the magnet end part (102) gradually increases from the base end part toward the tip end part thereof (i.e., from the inner peripheral side toward the outer peripheral side). Further, in this case, the extension width (W) of the magnet end part (102) (specifically, the length in the width direction at a tip end surface of the magnet end part (102)) is shorter than the extension length (L) of the magnet end part (102). Note that the shape (the cross-sectional shape) of the magnet slot (S110) corresponds to the shape (the cross-sectional shape) of the permanent magnet (100).

In addition, in this example, the magnetization directions (D1) of the magnet body (101) of the permanent magnet (100) and the magnetic pole center line (PC) of the permanent magnet (100) are set to intersect with each other on the outer peripheral side of the magnet body (101). Note that the inclination angle (θ2) of the magnetization direction (D2) of the magnet end part (102) with respect to the magnetic pole center line (PC) is greater than the inclination angle (θ1) of the magnetization direction (D1) of the magnet body (101) with respect to the magnetic pole center line (PC).

<Advantages of First Variation of Rotor>

In the case of the above-described configuration, the magnetic flux of the magnet end parts (102) of the permanent magnet (100) can easily extend toward the magnetic pole center line (PC) of the permanent magnet (100) on the outer peripheral side of the magnet body (101) of the permanent magnet (100), and therefore, magnetic flux leakage of the permanent magnets (100) can be reduced.

Moreover, the extension width (W) (specifically, the length in the width direction at the tip end surface of the magnet end part (102)) of the magnet end part (102) is shorter than the extension length (L) of the magnet end part (102). Thus, the permanent magnets (100) can be easily magnetized (polarized) such that the magnetization directions (D2) of the magnet end parts (102) and the magnetic pole center line (PC) intersect with each other on the outer peripheral side of the magnet body (101) and that the inclination angle (θ2) of the magnetization direction (D2) of the magnet end part (102) is greater than the inclination angle (θ1) of the magnetization direction (D1) of the magnet body (101).

In addition, the magnet body (101) is formed in the curved shape so as to be raised toward the center (O) of rotation of the rotor core (110), and the magnet end parts (102) bend toward the outer edge of the rotor core (110). Thus, the area of the outer peripheral surface (i.e., the magnetic pole face) of the permanent magnet (100) can be increased as compared to the case where the magnet body (101) is formed straight (see, e.g., the case illustrated in FIG. 3). This can increase the amount of flux linkage of the permanent magnet (100).

[Second Variation of Rotor]

Figure 7:
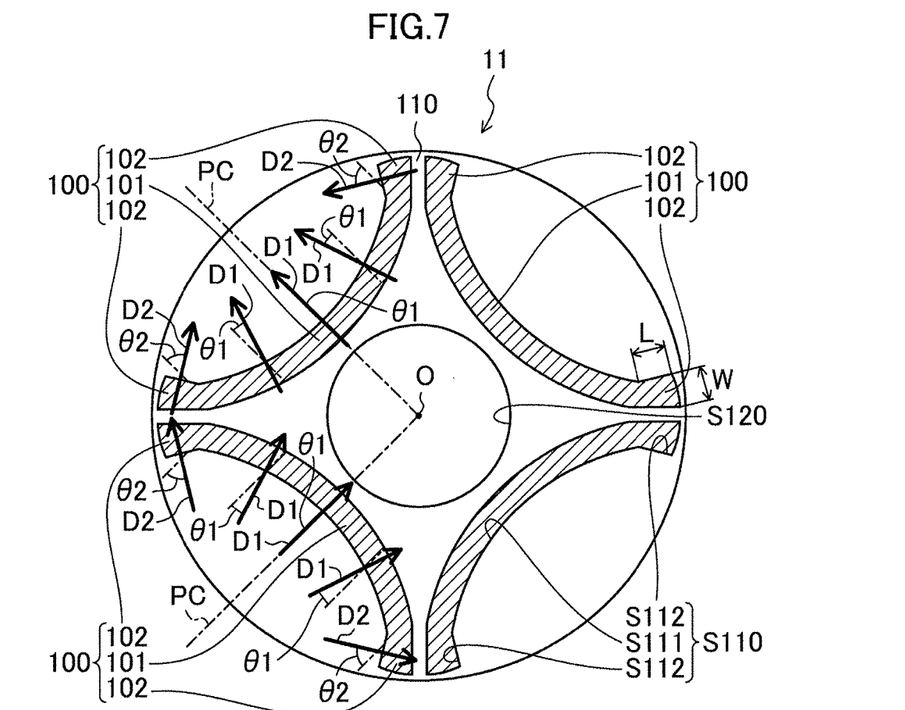
FIG. 7 is a cross-sectional view illustrating a second variation of the rotor.

As illustrated in FIG. 7, the magnet body (101) of the permanent magnet (100) may be formed in an arc shape so as to be raised toward the center (O) of rotation of the rotor core (110). In this example, the magnet body (101) of the permanent magnet (100) is formed symmetrical with respect to the magnetic pole center line (PC) of the permanent magnet (100). That is, in this example, the magnet body (101) is formed in an arc shape (an arc shape raised toward the inner peripheral side) symmetrical about the magnetic pole center line (PC). Note that in this example, the magnet end parts (102) of the permanent magnet (100) bend toward the outer peripheral side of the magnet body (101), and continuously extend respectively from both ends of the magnet body (101) in the peripheral direction toward the outer edge of the rotor core (110). That is, each magnet end part (102) extends so as to incline toward the magnetic pole center line (PC) of the permanent magnet (100) with respect to the line extending from a corresponding one of both ends of the magnet body (101) in the peripheral direction (in this example, the line extending in a tangential direction) while extending from the corresponding one of both ends of the magnet body (101) in the peripheral direction toward the outer edge of the rotor core (110).

Moreover, in this example, the magnet end parts (102) of the permanent magnet (100) are formed such that the extension width (W) of the magnet end part (102) gradually increases from the base end part toward the tip end part thereof (i.e., from the inner peripheral side toward the outer peripheral side) and that the extension width (W) of the magnet end part (102) (specifically, the length in the width direction at the tip end surface of the magnet end part (102)) is shorter than the extension length (L) of the magnet end part (102). Note that the shape (the cross-sectional shape) of the magnet slot (S110) corresponds to the shape (the cross-sectional shape) of the permanent magnet (100).

In addition, in this example, the magnetization directions (D1) of the magnet body (101) of the permanent magnet (100) and the magnetic pole center line (PC) of the permanent magnet (100) are set to intersect with each other on the outer peripheral side of the magnet body (101), and the inclination angle (θ2) of the magnetization direction (D2) of the magnet end part (102) with respect to the magnetic pole center line (PC) is greater than the inclination angle (θ1) of the magnetization direction (D1) of the magnet body (101) with respect to the magnetic pole center line (PC).

<Advantages of Second Variation of Rotor>

In the case of the above-described configuration, the magnetic flux of the magnet end parts (102) of the permanent magnet (100) can easily extend toward the magnetic pole center line (PC) of the permanent magnet (100) on the outer peripheral side of the magnet body (101) of the permanent magnet (100), and therefore, magnetic flux leakage of the permanent magnets (100) can be reduced.

Moreover, the extension width (W) (specifically, the length in the width direction at the tip end surface of the magnet end part (102)) of the magnet end part (102) is shorter than the extension length (L) of the magnet end part (102). Thus, the permanent magnets (100) can be easily magnetized (polarized) such that the magnetization directions (D2) of the magnet end parts (102) and the magnetic pole center line (PC) intersect with each other on the outer peripheral side of the magnet body (101) and that the inclination angle (θ2) of the magnetization direction (D2) of the magnet end part (102) is greater than the inclination angle (θ1) of the magnetization direction (D1) of the magnet body (101).

In addition, the magnet body (101) bends in the shape raised toward the center (O) of rotation of the rotor core (110), and the magnet end parts (102) bend toward the outer edge of the rotor core (110). Thus, the area of the outer peripheral surface (i.e., the magnetic pole face) of the permanent magnet (100) can be increased as compared to the case where the magnet body (101) is formed straight (see, e.g., the case illustrated in FIG. 3). This can increase the amount of flux linkage of the permanent magnet (100).

[Third Variation of Rotor]

Figure 8:
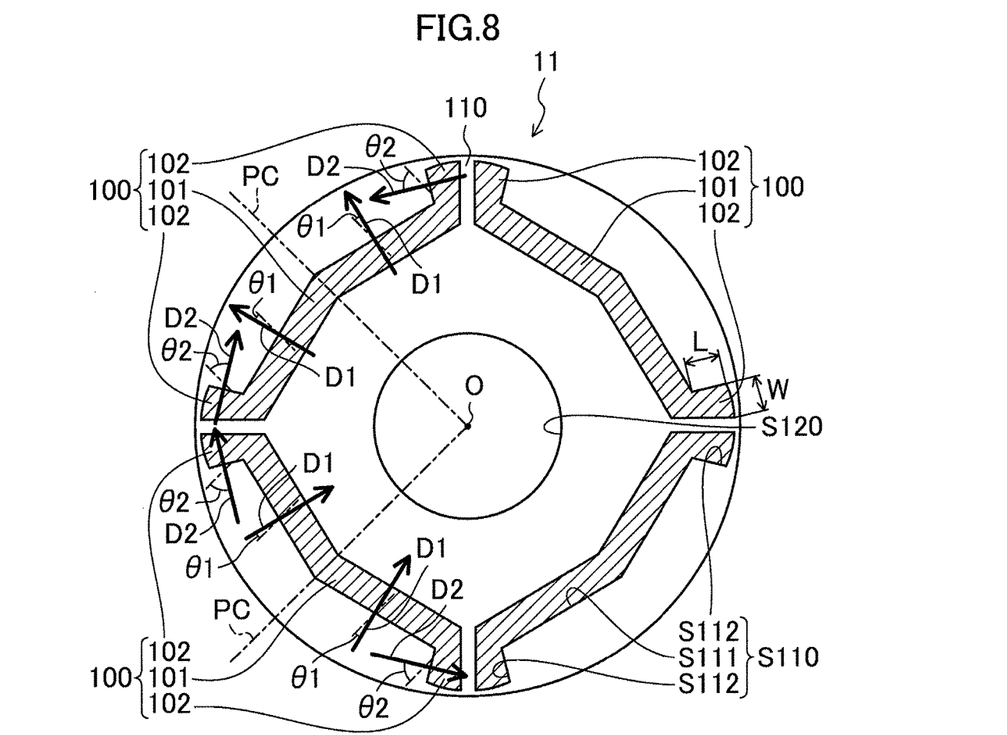
FIG. 8 is a cross-sectional view illustrating a third variation of the rotor.

As illustrated in FIG. 8, the magnet body (101) of the permanent magnet (100) may be formed in a curved shape so as to be raised toward the outer edge of the rotor core (110). In this example, the magnet body (101) of the permanent magnet (100) is formed in a V-shape so as to be raised toward the outer edge of the rotor core (110). Moreover, the magnet body (101) of the permanent magnet (100) is formed symmetrical with respect to the magnetic pole center line (PC) of the permanent magnet (100). That is, in this example, the magnet body (101) is formed in a V-shape (a V-shape raised toward the outer peripheral side) so as to be symmetrical about the magnetic pole center line (PC). Note that in this example, the magnet end parts (102) of the permanent magnet (100) also bend toward the outer peripheral side of the magnet body (101) so as to continuously extend respectively from both ends of the magnet body (101) in the peripheral direction toward the outer edge of the rotor core (110).

Moreover, in this example, the magnet end parts (102) of the permanent magnet (100) are formed such that the extension width (W) of the magnet end part (102) gradually increases from the base end part toward the tip end part thereof (i.e., from the inner peripheral side toward the outer peripheral side), and the extension width (W) of the magnet end part (102) (specifically, the length in the width direction at the tip end surface of the magnet end part (102)) is shorter than the extension length (L) of the magnet end part (102). Note that the shape (the cross-sectional shape) of the magnet slot (S110) corresponds to the shape (the cross-sectional shape) of the permanent magnet (100).

In addition, in this example, the magnetization directions (D1) of the magnet body (101) of the permanent magnet (100) and the magnetic pole center line (PC) (or the line extending from the magnetic pole center line (PC)) of the permanent magnet (100) are set to intersect with each other on the inner peripheral side of the magnet body (101). Note that the inclination angle (θ2) of the magnetization direction (D2) of the magnet end part (102) with respect to the magnetic pole center line (PC) is greater than the inclination angle (θ1) of the magnetization direction (D1) of the magnet body (101) with respect to the magnetic pole center line (PC).

<Details of Rotor>

Figure 9:
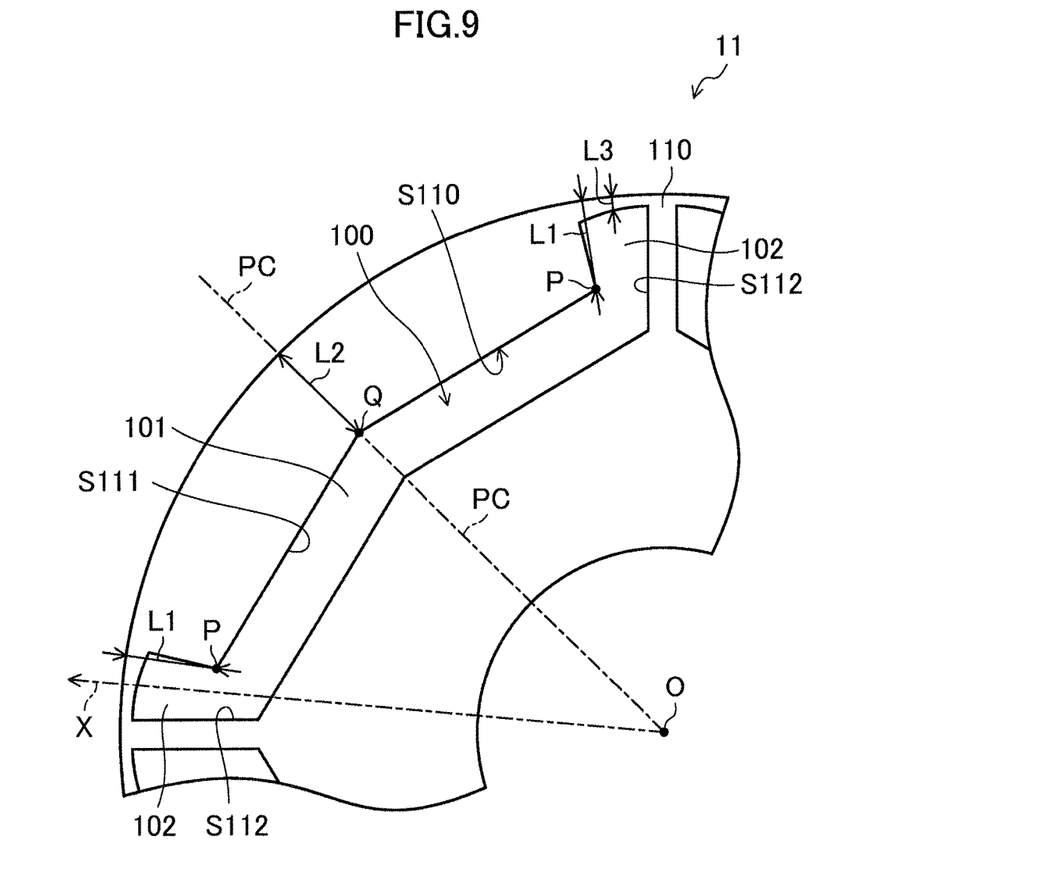
FIG. 9 is a partial cross-sectional view specifically illustrating the structure of the rotor illustrated in FIG. 8.

Next, the structure of the rotor (11) illustrated in FIG. 8 will be described in detail with reference to FIG. 9. Note that FIG. 9 is a partially-enlarged cross-sectional view of the rotor (11) illustrated in FIG. 8. Moreover, in FIG. 9, the permanent magnets (100) and the rotor core (110) are not hatched.

In each permanent magnet (100), the minimum radial distance (L2) from the outer peripheral surface of the magnet body (101) to the outer edge of the rotor core (110) is shorter than the radial distance (L1) from the connection point (P) (specifically, a bending point on the outer peripheral side) between the magnet body (101) and the magnet end part (102) to the outer edge of the rotor core (110). In this example, the minimum radial distance (L2) is the radial distance from the outermost point (Q) of the magnet body (101) to the outer edge of the rotor core (110). Moreover, in each permanent magnet (100), the radial distance (L3) from a tip end of the magnet end part (102) (specifically, the middle of the tip end surface of the magnet end part (102)) to the outer edge of the rotor core (110) is shorter than the minimum radial distance (L2) from the outer peripheral surface of the magnet body (101) to the outer edge of the rotor core (110).

Further, in each permanent magnet (100), the magnet end part (102) extends in the radial direction of the rotor core (110). Specifically, the extension direction (X) of the magnet end part (102) (in this example, the direction along the center line of the magnet end part (102)) is coincident with the radial direction of the rotor core (110).

Each permanent magnet (100) is formed symmetrical with respect to the magnetic pole center line (PC) thereof, and the outermost point (Q) of the magnet body (101) is on the magnetic pole center line (PC).

<Advantages of Third Variation of Rotor>

In the case of the above-described configuration, the magnetic flux of the magnet end parts (102) of the permanent magnet (100) can easily extend toward the magnetic pole center line (PC) of the permanent magnet (100) on the outer peripheral side of the magnet body (101) of the permanent magnet (100), and therefore, magnetic flux leakage of the permanent magnets (100) can be reduced.

Moreover, the extension width (W) (specifically, the length in the width direction at the tip end surface of the magnet end part (102)) of the magnet end part (102) is shorter than the extension length (L) of the magnet end part (102). Thus, the permanent magnets (100) can be easily magnetized (polarized) such that the magnetization directions (D2) of the magnet end parts (102) and the magnetic pole center line (PC) intersect with each other on the outer peripheral side of the magnet body (101) and that the inclination angle (θ2) of the magnetization direction (D2) of the magnet end part (102) is greater than the inclination angle (θ1) of the magnetization direction (D1) of the magnet body (101).

In addition, in each permanent magnet (100), since the magnet body (101) bends in the shape raised toward the outer edge of the rotor core (110), the distance between the outer peripheral surface of the magnet body (101) and the outer edge of the rotor core (110) can be shortened. Thus, magnetic saturation can be easily caused at the part (i.e., the outer peripheral part of the rotor core (110)) between the outer peripheral surface of the permanent magnet (100) and the outer edge of the rotor core (110), leading to a decrease in the d-axis inductance of the rotor (11).

Further, in each permanent magnet (100), the magnet body (101) bends in the shape raised toward the outer edge of the rotor core (110), and the magnet end parts (102) bend toward the outer edge of the rotor core (110). Thus, the area of the outer peripheral surface (i.e., the magnetic pole face) of the permanent magnet (100) can be increased as compared to the case where the magnet body (101) is formed straight (see, e.g., the case illustrated in FIG. 3). This can increase the amount of flux linkage of the permanent magnet (100).

Moreover, since the magnet body (101) and the magnet end parts (102) are integrally formed in each permanent magnet (100), occurrence of magnetic flux leakage between the magnet body (101) and each magnet end part (102) can be suppressed. Thus, the amount of flux linkage of the permanent magnet (100) can be increased.

In rotation control (in particular, flux weakening control) of the rotor (11), a current limit value (i.e., the upper limit of current which can be applied to the coil (202) of the stator (12)) is defined depending on the ratio (φa/Ld) of the amount of flux linkage of the permanent magnet (100) to the d-axis inductance of the rotor (11). The current limit value decreases as the ratio (φa/Ld) of the flux linkage amount to the d-axis inductance decreases. That is, a lower ratio (φa/Ld) of the flux linkage amount to the d-axis inductance results in more severe current limitation in rotation control of the rotor (11).

On the other hand, in the rotor (11) illustrated in FIGS. 8 and 9, the d-axis inductance of the rotor (11) can be decreased, and the amount of flux linkage of the permanent magnet (100) can be increased. Thus, the ratio (φa/Ld) of the flux linkage amount to the d-axis inductance can be increased. This results in less severe current limitation in rotation control (in particular, flux weakening control). Consequently, the operation performance of the rotary electric machine (10) can be improved.

In addition, in each permanent magnet (100), the minimum radial distance (L2) from the outer peripheral surface of the magnet body (101) to the outer edge of the rotor core (110) is shorter than the radial distance (L1) from the connection point (P) between the magnet body (101) and the magnet end part (102) to the outer edge of the rotor core (110), and therefore, the outer peripheral surface of the magnet body (101) can be positioned closer to the outer edge of the rotor core (110). This results in a shorter distance between the outer peripheral surface of the magnet body (101) and the outer edge of the rotor core (110). Consequently, the d-axis inductance of the rotor core (110) can be further decreased.

Further, in each permanent magnet (100), the radial distance (L3) from the tip end of the magnet end part (102) to the outer edge of the rotor core (110) is shorter than the minimum radial distance (L2) from the outer peripheral surface of the magnet body (101) to the outer edge of the rotor core (110), and therefore, the tip end of the magnet end part (102) can be positioned closer to the outer edge of the rotor core (110). Thus, occurrence of magnetic flux leakage between adjacent ones of the permanent magnets (100) can be suppressed, leading to a further increase in the amount of flux linkage of the permanent magnet (100).

Moreover, in each permanent magnet (100), the magnet end parts (102) are formed so as to extend in the radial direction of the rotor core (110), and therefore, the magnetic flux of the magnet end parts (102) can be effectively utilized. That is, the flow of magnetic flux between the magnet end part (102) of the permanent magnet (100) and the counter tooth part (the tooth part (212) facing the permanent magnet (100)) of the stator (12) is facilitated while the flow of magnetic flux between the magnet end part (102) of the permanent magnet (100) and the adjacent tooth part (another tooth part (212) adjacent to the counter tooth part) of the stator (12) can be reduced. Thus, the amount of flux linkage of the permanent magnet (100) can be further increased.

In addition, since each permanent magnet (100) is formed symmetrical with respect to the magnetic pole center line (PC), the symmetric magnetic flux distribution of the permanent magnet (100) can be ensured. Thus, torque ripple occurring in rotary driving of the rotor (11) can be reduced.

In each permanent magnet (100), the minimum radial distance (L2) from the outer peripheral surface of the magnet body (101) to the outer edge of the rotor core (110) may be longer than the radial distance (L1) from the connection point (P) between the magnet body (101) and the magnet end part (102) to the outer edge of the rotor core (110), or may be equal to the radial distance (L1). The radial distance (L3) from the tip end of the magnet end part (102) to the outer edge of the rotor core (110) may be longer than the minimum radial distance (L2) from the outer peripheral surface of the magnet body (101) to the outer edge of the rotor core (110), or may be equal to the minimum radial distance (L2). The magnet end parts (102) do not necessarily extend in the radial direction of the rotor core (110). Moreover, each permanent magnet (100) is not necessarily formed symmetrical with respect to the magnetic pole center line (PC).

[Other Embodiments]

The case where the permanent magnets (100) are the bonded magnets has been described above as an example, but the permanent magnets (100) may be sintered magnets. For example, each permanent magnet (100) can be configured such that a combination of the sintered magnet serving as the magnet body (101) and sintered magnets serving as the magnet end parts (102) is housed in the magnet slot (S110). That is, the pair of magnet end parts (102) are not necessarily formed integrally with the magnet body (101).

Moreover, the case where each coil (202) is wound around a corresponding one of the tooth parts (212) by concentrated winding has been described as an example, but the coils (202) may be wound around the tooth parts (212) by distributed winding.

In addition, the case where the magnet body (101) of each permanent magnet (100) is formed in the V-shape having a single vertex (or formed in the arc shape) has been described in the first variation (see FIG. 6), the second variation (see FIG. 7), and the third variation (see FIG. 8) of the rotor (11), but the magnet body (101) may be formed in a corrugated shape having a plurality of vertices.

Further, the case where the magnet body (101) of each permanent magnet (100) is formed in such a V-shape that a single vertex thereof is at the outermost point (Q) has been described in the third variation (see FIGS. 8 and 9) of the rotor (11), but the magnet body (101) may be formed in such a corrugated shape (as a whole, a corrugated shape raised toward the outer edge of the rotor core (110)) that two or more of a plurality of vertices are at the outermost points (Q).

Moreover, the case where the rotary electric machine (10) is the electric motor has been described as an example, but the rotary electric machine (10) may be an electric generator.

The above-described embodiments may be optionally implemented in combination.

The above-described embodiments have been set forth for the purpose of preferred examples in nature, and are not intended to limit the scope, applications, and use of the invention.

INDUSTRIAL APPLICABILITY

As described above, the above-described rotary electric machine is useful as, e.g., an electric motor for driving a compressor of an air conditioner.

DESCRIPTION OF REFERENCE CHARACTERS

10 Rotary Electric Machine
20 Drive Shaft
30 Casing
11 Rotor
12 Stator
100 Permanent Magnet
101 Magnet Body
102 Magnet End Part
110 Rotor Core
S110 Magnet Slot
PC Magnetic Pole Center Line
D1, D2 Magnetization Direction
θ1, θ2 Inclination Angle
201 Stator Core
202 Coil
211 Back Yoke Part
212 Tooth Part
213 Brim Part

The invention claimed is:

1. A rotor comprising:
a rotor core; and
a plurality of permanent magnets embedded in the rotor core,
wherein each permanent magnet includes
a magnet body formed across a radial direction of the rotor core so as to be raised toward a center of rotation of the rotor core, and
a pair of magnet end parts bending toward an outer peripheral side of the magnet body and extending respectively from both ends of the magnet body in a peripheral direction toward an outer edge of the rotor core,
magnetization directions of the magnet body of the permanent magnet and a magnetic pole center line of the permanent magnet intersect with each other on the outer peripheral side of the magnet body of the permanent magnet,
magnetization directions of the magnet end parts of the permanent magnet and the magnetic pole center line of the permanent magnet intersect with each other on the outer peripheral side of the magnet body of the permanent magnet,
an inclination angle of each magnetization direction of the magnet end part of the permanent magnet with respect to the magnetic pole center line of the permanent magnet is greater than an inclination angle of the magnetization direction of the magnet body of the permanent magnet with respect to the magnetic pole center line of the permanent magnet, and
the intersection between the magnetization directions of the pair of magnet end parts of the permanent magnet is located closer to the center of rotation of the rotor core than the intersection between the magnetization directions of the magnet body of the permanent magnet is.

2. The rotor of claim 1, wherein
the permanent magnets are bonded magnets.

3. The rotor of claim 2, wherein
an extension width of the magnet end part of the permanent magnet is shorter than an extension length of the magnet end part of the permanent magnet.

4. A rotary electric machine comprising:
the rotor of claim 1; and
a stator into which the rotor is inserted.

5. The rotor of claim 1, wherein
the magnet body of the permanent magnet is in a V-shape, and defined by two substantially straight sections extending from a center of the V-shape,
the pair of the magnet end parts of the permanent magnet bend away from the respective ends of the straight sections of the magnet body toward the outer peripheral side of the magnet body, and extends from the respective ends of the straight sections of the magnet body in the peripheral direction toward the outer edge of the rotor core, and
the intersection between the magnetization directions of the pair of magnet end parts of the permanent magnet is located closer to the center of rotation of the rotor core than the intersection between the magnetization directions of the respective straight sections of the magnet body of the permanent magnet is.

* * * * *